(12) United States Patent
Park et al.

(10) Patent No.: US 8,384,846 B2
(45) Date of Patent: Feb. 26, 2013

(54) BACKLIGHT UNIT AND LIQUID CRYSTAL DISPLAY HAVING THE SAME

(75) Inventors: Jae-hyun Park, Seoul (KR); Myung-ryul Jung, Suwon-si (KR); Yong-dok Cha, Suwon-si (KR); Jun-seok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 12/433,232

(22) Filed: Apr. 30, 2009

(65) Prior Publication Data

US 2010/0079697 A1 Apr. 1, 2010

(30) Foreign Application Priority Data

Sep. 26, 2008 (KR) .................. 10-2008-0094886

(51) Int. Cl.
*G02F 1/1335* (2006.01)
(52) U.S. Cl. ............................................ 349/65; 349/58

(58) Field of Classification Search ............ 349/58, 349/65, 61
See application file for complete search history.

(56) References Cited

U.S. PATENT DOCUMENTS

| | | | |
|---|---|---|---|
| 6,998,650 B1 | 2/2006 | Wu | |
| 7,573,540 B2 * | 8/2009 | Katsuda et al. | 349/58 |
| 8,064,007 B2 * | 11/2011 | Mo et al. | 349/58 |
| 2007/0247870 A1 | 10/2007 | Sakai et al. | |
| 2008/0117361 A1 * | 5/2008 | Chun et al. | 349/65 |
| 2008/0218660 A1 * | 9/2008 | Suzuki | 349/65 |

FOREIGN PATENT DOCUMENTS

| JP | 2007-26916 A | 2/2007 |
|---|---|---|
| KR | 2001-0046077 A | 6/2001 |

* cited by examiner

*Primary Examiner* — Eric Wong
(74) *Attorney, Agent, or Firm* — Sughrue Mion, PLLC

(57) ABSTRACT

A backlight unit including: a light emitting diode (LED) module including a metal substrate and an LED which is disposed on a first side of the metal substrate; a frame on which the LED module is mounted; a first mounting portion formed lengthwise on the LED module; and a second mounting portion formed on the frame, the second mounting portion remaining within a width of the LED module.

29 Claims, 7 Drawing Sheets

US 8,384,846 B2

BACKLIGHT UNIT AND LIQUID CRYSTAL DISPLAY HAVING THE SAME

CROSS-REFERENCE TO RELATED APPLICATIONS

This application claims priority from Korean Patent Application No. 10-2008-0094886, filed Sep. 26, 2008, in the Korean Intellectual Property Office, the disclosure of which is incorporated herein by reference in its entirety.

BACKGROUND OF THE INVENTION

1. Field of the Invention

Apparatuses consistent with the present invention relate to a liquid crystal display (LCD), and more particularly, to a backlight unit used in the LCD.

2. Description of the Related Art

An LCD is a display apparatus which is widely used because of its lightness, miniature size, full-color, and high resolution. An LCD displays video using a liquid crystal, which is a light receiving device that is not capable of emitting light by itself, and thus a backlight unit is required to supply light to a liquid crystal panel.

Recently, there have been many attempts to further reduce the thickness of the LCD. To reduce the thickness of the LCD, there is a need to reduce the thickness of a backlight unit, which is a main component of the LCD.

A light source of a backlight unit generates considerable heat. If the light source is not cooled properly, the heat from the light source may become excessive. Therefore, there is a need to reduce the thickness of a backlight unit and appropriately cool a light source of the backlight unit.

SUMMARY OF THE INVENTION

Exemplary embodiments of the present invention overcome the above problems and/or disadvantages and other disadvantages not described above. Also, the present invention is not required to overcome the disadvantages described above, and an exemplary embodiment of the present invention may not overcome any of the problems described above.

An aspect of embodiments of the present invention provides a compact backlight unit and an LCD having the backlight unit.

According to an aspect of the present invention, there is provided a backlight unit including a light emitting diode (LED) module including an LED and a metal substrate on which the LED is mounted; a frame to which the LED module is mounted; a first mounting portion formed lengthwise on the LED module; and a second mounting portion formed on the frame so as to remain within a width of the LED module.

The LED module may be inserted into the frame by engagement between the first mounting portion and the second mounting portion.

The backlight unit may further include a fixing unit which fastens the LED module inserted into the frame.

The fixing unit may include a fixing groove which is formed in one of the metal substrate and the frame; and a fixing projection which is fitted into the fixing groove.

The fixing unit may further include an elastic member which pushes the fixing projection towards the fixing groove after the LED module is completely inserted into the frame.

The fixing unit may be fitted into the second mounting portion after the LED module is completely inserted into the frame.

The first mounting portion may be formed on the opposite side to a side of the metal substrate on which the LED is formed.

The first mounting portion may be formed on one side of the metal substrate.

The first mounting portion may be formed on both sides of the metal substrate.

The first mounting portion may have the form of a slit, and the second mounting portion may have the form of a rib corresponding to the slit.

The first mounting portion may have the form of a rib, and the second mounting portion may have the form of a slit corresponding to the rib.

The first mounting portion may have the form of a T-shaped slit.

The first mounting portion may have the form of an L-shaped slit.

The first mounting portion may have the form of a straight slit.

The first mounting portion may have a plurality of slits.

The first mounting portion and the second mounting portion may have grooved surfaces formed thereon.

The LED module may be disposed on an edge of a liquid crystal panel.

The LED module may be disposed below the liquid crystal panel.

According to an aspect of the present invention, there is provided an LCD including a liquid crystal panel which displays an image; and a backlight unit, which supplies light to the liquid crystal panel.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
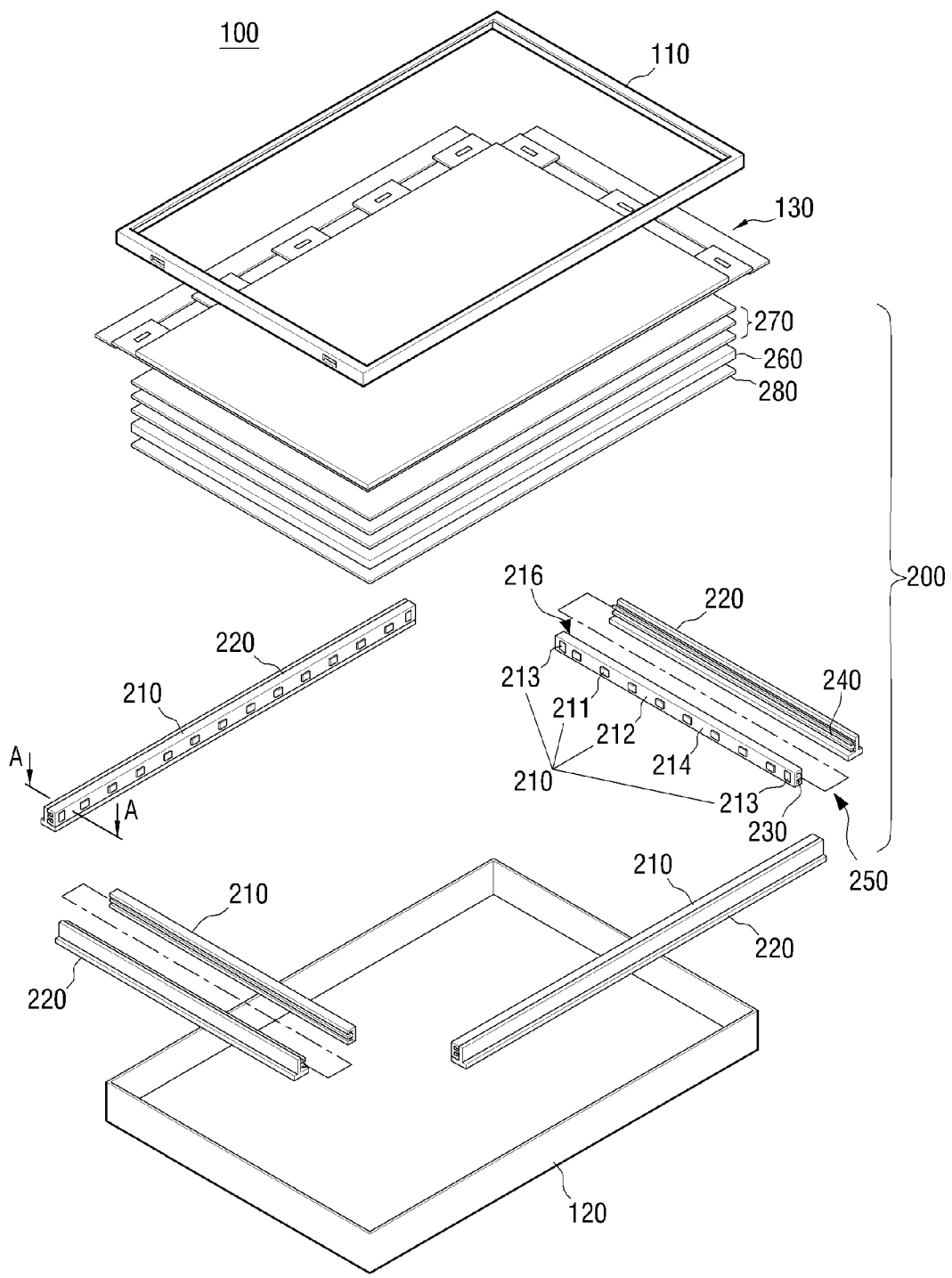
FIG. 1 is an exploded perspective view of an LCD according to an exemplary embodiment of the present invention.

Exemplary embodiments of the present invention are described in greater detail below with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 2:
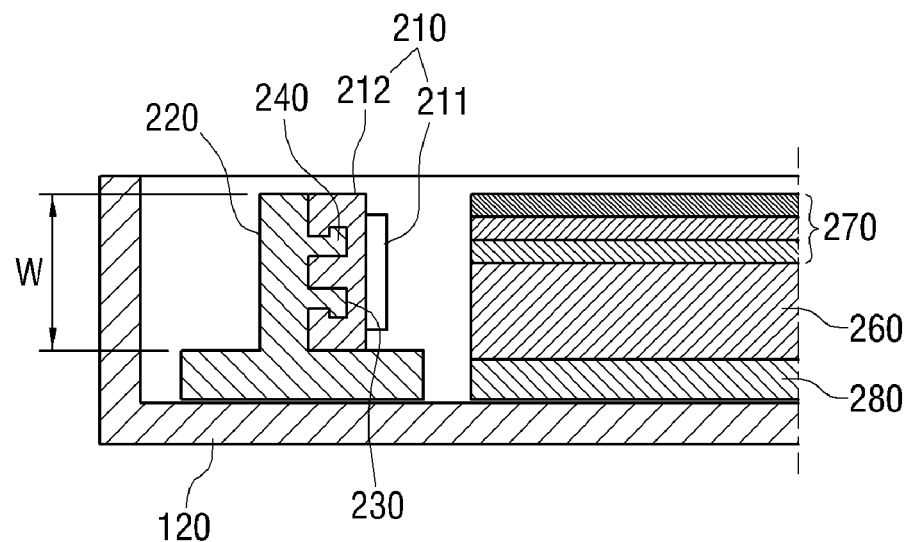
FIG. 2 is a sectional view of a backlight unit shown in FIG. 1.

FIG. 1 is an exploded perspective view of an LCD 100 according to an exemplary embodiment of the present invention, and FIG. 2 is a sectional view of a backlight unit 200 shown in FIG. 1.

The LCD 100 shown in FIG. 1 includes an upper case 110, a lower case 120, a liquid crystal panel 130, and a backlight unit 200.

The upper case 110 and lower case 120 form the exterior of the LCD 100, and house internal components of the LCD 100.

The liquid crystal panel 130 receives light from the backlight unit 200 and displays an image. The configuration and functions of the liquid crystal panel 130 are known to those skilled in the art.

The backlight unit 200 supplies light to the liquid crystal panel 130. The backlight unit 200 includes an LED module 210, a frame 220, a first mounting portion 230, a second mounting portion 240, a fixing unit 250, a light guide plate (LGP) 260, an optical sheet 270, and a reflective sheet 280.

The LED module 210 is used as a light source of the backlight unit 200. The LED module 210 is disposed on an edge of or proximate to an edge boundary of the liquid crystal panel 130, so the backlight unit 200 shown in FIG. 1 is referred to as an edge-type backlight unit. The LED module 210 includes one or more LEDs 211, a metal substrate 212, and connectors 213.

The LEDs 211 are arranged in series on the metal substrate 212, as shown in FIG. 1, and are connected to each other electrically by a wire (not shown). When a power source supplies power to the LEDs 211, the LEDs 211 emit light to the LGP 260. As technology has developed, the LEDs 211 may be substantially reduced in size to reduce the thickness of the backlight unit 200. Accordingly, the thickness of the backlight unit 200 may be determined by the total thickness of the LGP 260, optical sheet 270, and reflective sheet 280, but the size of the LED module 210 does not affect the thickness of the backlight unit 200. In other words, referring to FIG. 2, the size of the LED module 210 may be less than the total thickness of the LGP 260, optical sheet 270 and reflective sheet 280.

The LEDs 211 are arranged on a first side 214 of the metal substrate 212 in series. The wire electrically connecting the LEDs 211 is also disposed on the metal substrate 212. Additionally, heat generated by the LEDs 211 is transferred to the frame 220 through the metal substrate 212.

The connectors 213 are connected to a power source (not shown), which supplies power to the LEDs 211. The connectors 213 are disposed on both ends of the metal substrate 212.

The frame 220 is disposed on an edge of the liquid crystal panel 130, and is secured on the lower case 120. The LED module 210 is attached to the frame 220.

The first mounting portion 230 is formed lengthwise on the LED module 210 and extends along substantially the entire length of the LED module 210.

The second mounting portion 240 extends from the frame 220 so as to remain within width W of the LED module 210. As shown in FIGS. 1 and 2, the second mounting portion 240 may have a shape corresponding to the first mounting portion 230, and thus the first mounting portion 230 and second mounting portion 240 may be matchingly engaged to each other so that the LED module 210 may be inserted into the frame 220.

If the LED module 210 is mounted to the frame 220 by screw engagement, instead of using the first mounting portion 230 and second mounting portion 240, productivity may be reduced because assembly of the screw engagement requires considerable time. Furthermore, as the size of the liquid crystal panel 130 increases, the length of the LED module 210 also increases, and thus much time may be required for the screw engagement. Additionally, the number of screws required for assembly of the screw engagement may also increase, and accordingly manufacturing costs may increase. Furthermore, if an external shock is applied to the LCD 100, the screws may damage the wire disposed on the metal substrate 212. However, according to the exemplary embodiment of the present invention, the LED module 210 is inserted and mounted to the frame 220 by the first mounting portion 230 and second mounting portion 240, and therefore it is possible to prevent problems due to the screw engagement.

As described above, the second mounting portion 240 extends from the frame 220 to remain within width W of the LED module 210. Referring to FIG. 2, the height of the frame 220 from the lower case 120 may be equal to or less than the height of the LED module 210 disposed on the frame 220 from the lower case 120. In the exemplary embodiment, the frame 220 and the LED module 210 disposed on the frame 220 are the same height from the lower case 120. Since the LED module 210 may be stably fixed to the frame 220 by the first mounting portion 230 and second mounting portion 240, there is no need to additionally fix an upper portion of the LED module 210. Accordingly, it is possible to reduce the thickness of the backlight unit 200. As described above, the thickness of the backlight unit 200 may be determined according to the total thickness of the LGP 260, optical sheet 270 and reflective sheet 280, but the size of the LED module 210 does not affect the thickness of the backlight unit 200.

If the LCD 100 is used for a long period of time, the temperature of the LEDs 211 may rise. To prevent the LEDs 211 from being damaged, the temperature of the LEDs 211 needs to be kept below about 80° C. According to the exemplary embodiment of the present invention, the heat generated by the LEDs 211 is transferred to the frame 220 through the metal substrate 212, and thus the frame 220 may function as a heat sink. As shown in FIGS. 1 and 2, the first mounting portion 230 has the form of a slit formed in the metal substrate 212, and the second mounting portion 240 has the form of a rib corresponding to the slit and extending from the frame 220. Accordingly, a contact area between the metal substrate 212 and the frame 220 may be increased, compared to a situation in which the LED module 210 is engaged with the frame 220 by the screw engagement. Thus, it is possible to improve the cooling performance of the LEDs 211. Consequently, in the exemplary embodiment, it is possible to reduce the thickness of the backlight unit 200 and improve the cooling performance of the LEDs 211.

In the exemplary embodiment, the first mounting portion 230 includes two slits formed on a second side 216 of the metal substrate 212, opposite to the first side 214 of the metal substrate 212 on which the LEDs 211 are arranged. While the first mounting portion 230 has the form of slits and the second mounting portion 240 has the form of ribs in the exemplary embodiment, the first mounting portion 230 and second mounting portion 240 may have various shapes and structures, for example, the first mounting portion 230 may be configured in the form of one or more ribs and the second mounting portion 240 may be configured in the form of one or more slits. FIGS. 3A to 3E illustrate various exemplary configurations of the first mounting portion 230 and the second mounting portion 240 which are shown enlarged in order to facilitate understanding of the exemplary embodiments.

Figure 3A:
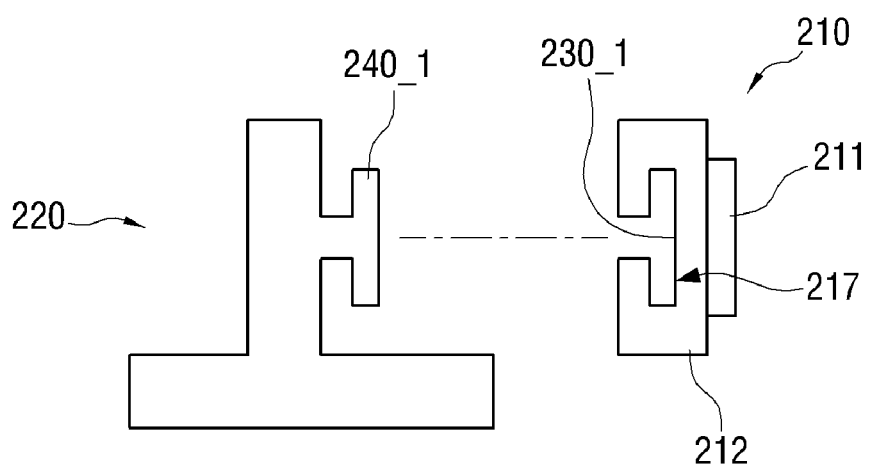
FIGS. 3A to 3E illustrate exemplary configurations of a first mounting portion and a second mounting portion.

In FIG. 3A, a first mounting portion 230_1 has a T-shaped slit disposed about a middle portion 217 of the metal substrate 212. The second mounting portion 240_1 has a matching T-shaped rib corresponding to the T-shaped slit.

Figure 3B:
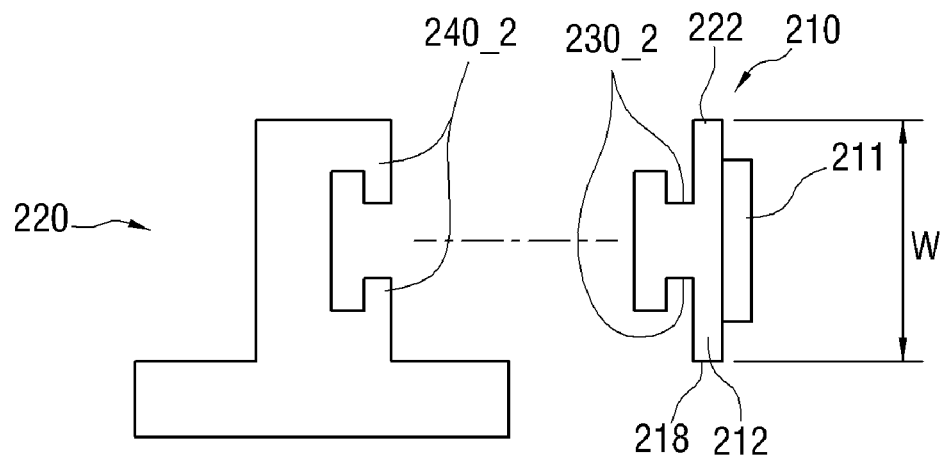

In FIG. 3B, a first mounting portion 230_2 has two straight slits on third and fourth opposing sides 218 and 222 of the metal substrate 212. The third side 218 and the fourth side 222 neighbor the first side 214. A second mounting portion 240_2 has matching two ribs corresponding to the two straight slits. In this case, the second mounting portion 240_2 is formed to remain within width W of the LED module 210, in order to prevent an increase in the thickness of the backlight unit 200.

Figure 3C:
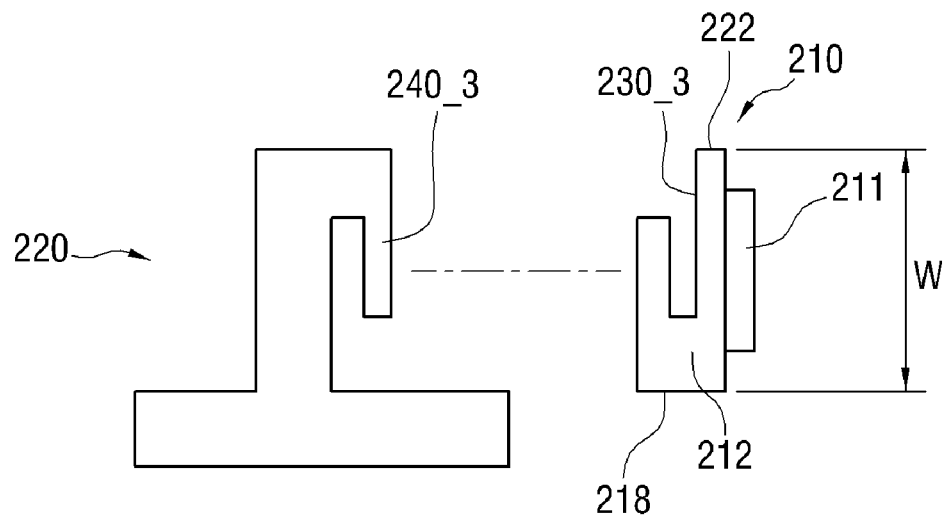

In FIG. 3C, a first mounting portion 230_3 has a straight slit extending from the fourth side 222 of the metal substrate 212 toward the third side 218. A second mounting portion 240_3 has a matching rib corresponding to the straight slit. In this situation, the second mounting portion 240_3 is formed to remain within width W of the LED module 210, to prevent an increase in the thickness of the backlight unit 200.

Figure 3D:
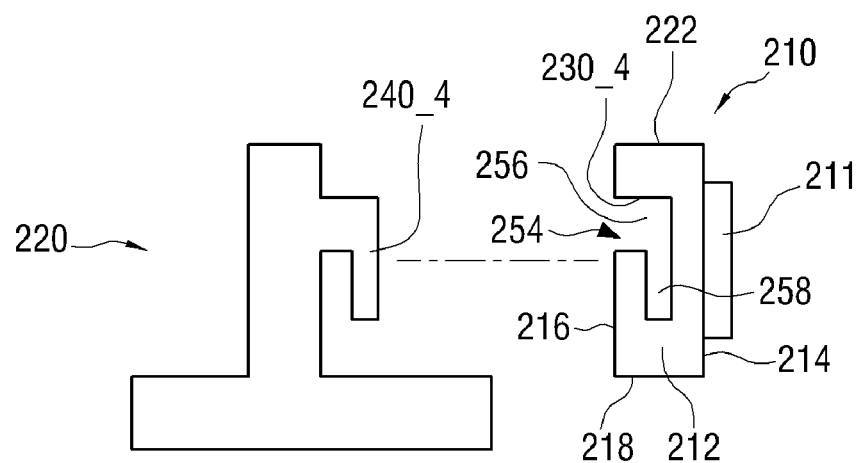

In FIG. 3D, a first mounting portion 230_4 has an L-shaped slit 254. A first portion 256 of the L-shaped slit 254 may extend from the second side 216 of the metal substrate 212 toward the first side 214 of the metal substrate 212 on which the LEDs 211 are arranged. A second portion 258 of the L-shaped slit 254 may extend in a direction from the fourth side 222 to the third side 218. A second mounting portion 240_4 has a matching rib corresponding to the L-shaped slit.

Figure 3E:
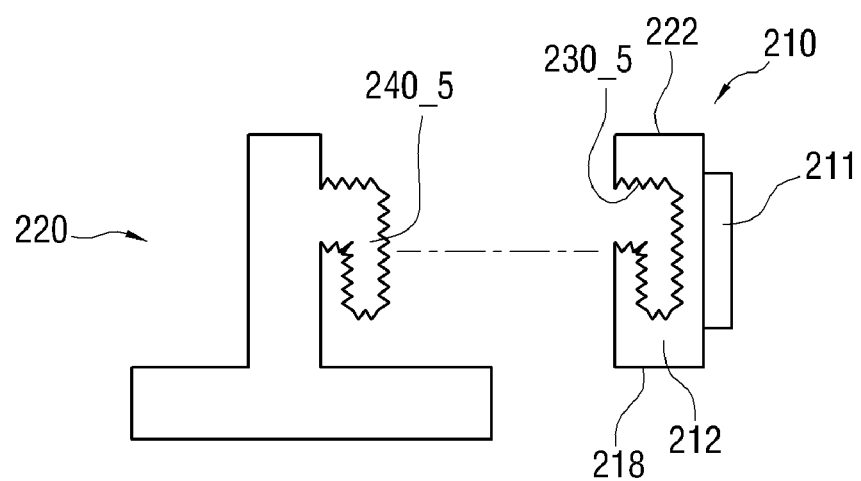

In FIG. 3E, a first mounting portion 230_5 has an L-shaped slit, similar to FIG. 3D and a second mounting portion 240_5 has a matching rib. In addition, surfaces of the L-shaped slit and the matching rib have grooved surfaces. Accordingly, the contact area between the metal substrate 212 and the frame 220 may be increased, and thus the cooling performance of the LEDs 211 may be improved. Additionally, the LED module 210 may be secured to the frame 220 more stably.

The configurations of the first mounting portion and second mounting portion shown in FIGS. 3A to 3E are merely exemplary illustrations, and thus the first mounting portion and second mounting portion may vary in shape and structure.

Figure 4:
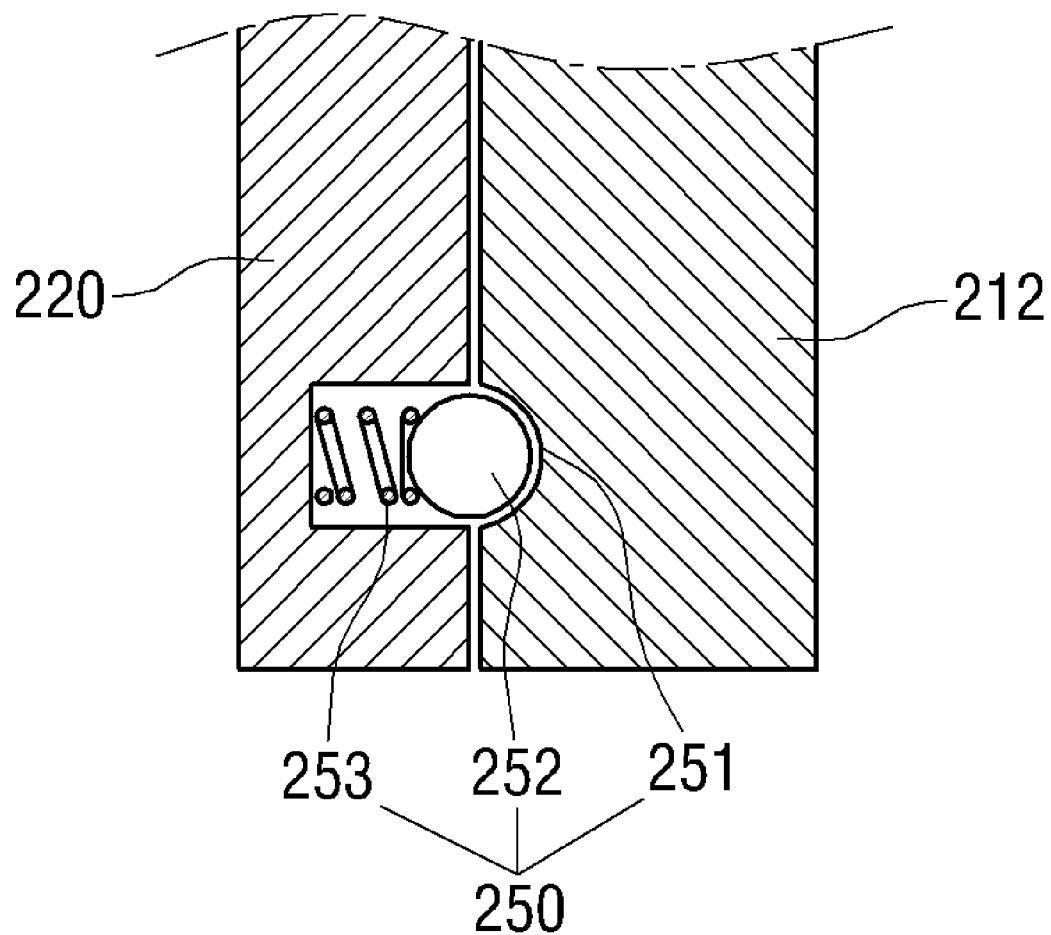
FIG. 4 is a partial sectional view of a fixing unit, taken along line A-A in FIG. 1.

FIG. 4 is a partial sectional view of the fixing unit 250, taken along line A-A in FIG. 1. The fixing unit 250 fastens the LED module 210 inserted into the frame 220, so as to prevent the LED module 210 from being detached from the frame 220. The fixing unit 250 includes a fixing groove 251, a fixing projection 252, and an elastic member 253.

The fixing groove 251 is formed on one end of the metal substrate 212. The shape of the fixing projection 252 extending from the frame 220 corresponds to the shape of the fixing groove 251, so that the fixing projection 252 may be inserted into the fixing groove 251. The fixing projection 252 is connected to the elastic member 253. When the LED module 210 is being inserted into the frame 220, the metal substrate 212 pushes the fixing projection 252. After the LED module 210 is completely inserted into the frame 220, the fixing projection 252 is made to slide into place in the fixing groove 251 by the elastic member 253 to be fitted into the fixing groove 251.

The fixing unit 250 configured as described above is merely exemplary. Alternatively, the fixing groove 251 may be formed on the frame 220, and the fixing projection 252 may extend from the metal substrate 212. Thus, the fixing unit 250 may have various shapes and structures capable of fastening the LED module 210 that has been inserted into the frame 220.

The LGP 260 guides light emitted from the LEDs 211 towards the liquid crystal panel 130. The LGP 260 is a plate member having a predetermined thickness, and may be made of, for example, transparent acryl, polymethylmethacrylate (PMMA), plastic, or glass.

The optical sheet 270 is disposed above the LGP 260 to diffuse and/or concentrate light. The optical sheet 270 may include a light diffusion plate and/or a prism sheet.

The reflective sheet 280 is disposed below the LGP 260, to reflect light emitted from the LEDs 211 towards the liquid crystal panel 130.

Another exemplary embodiment of the present invention is described below with reference to FIGS. 5 and 6.

Figure 5:
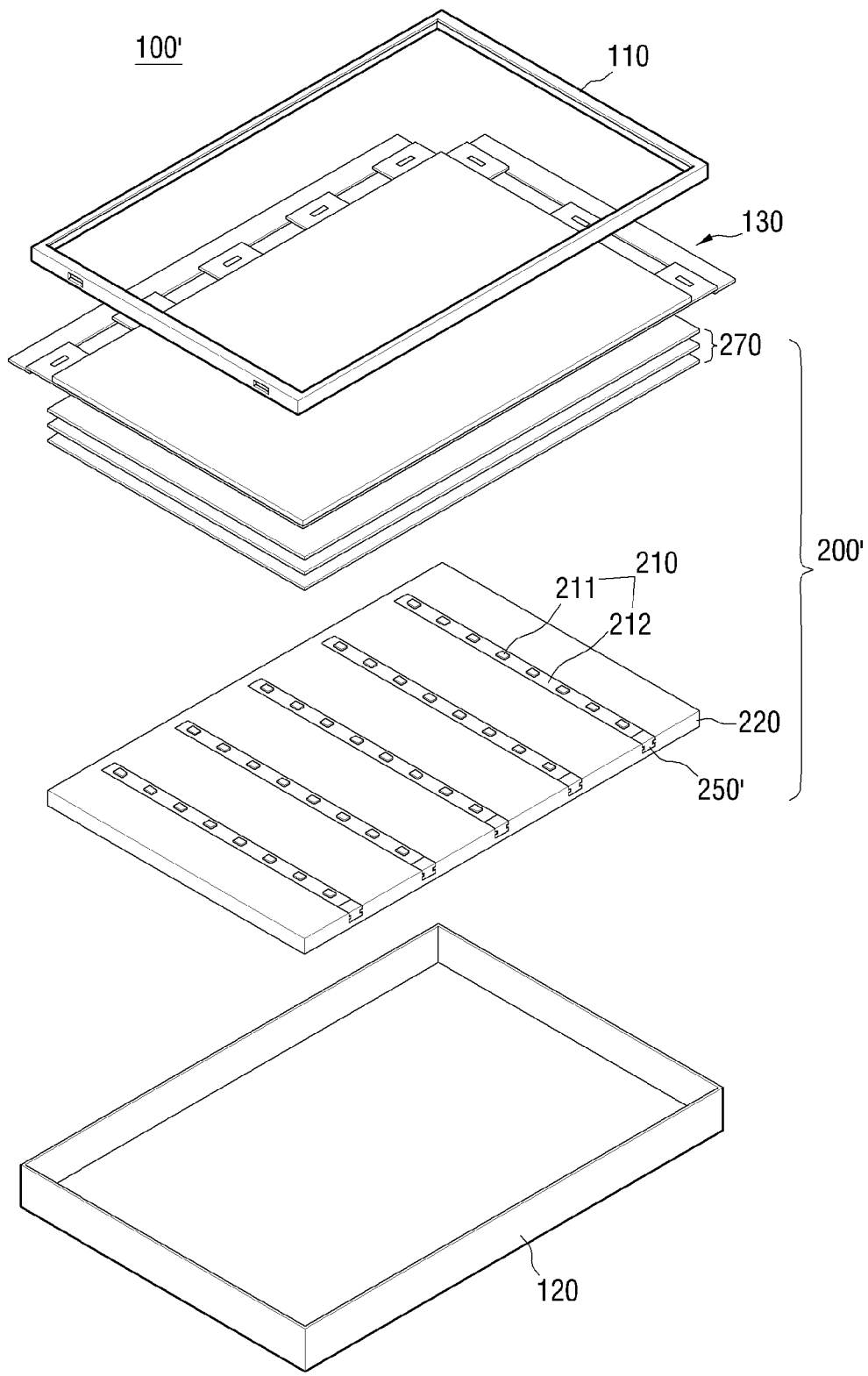
FIG. 5 is an exploded perspective view of an LCD according to another exemplary embodiment of the present invention.
Figure 6:
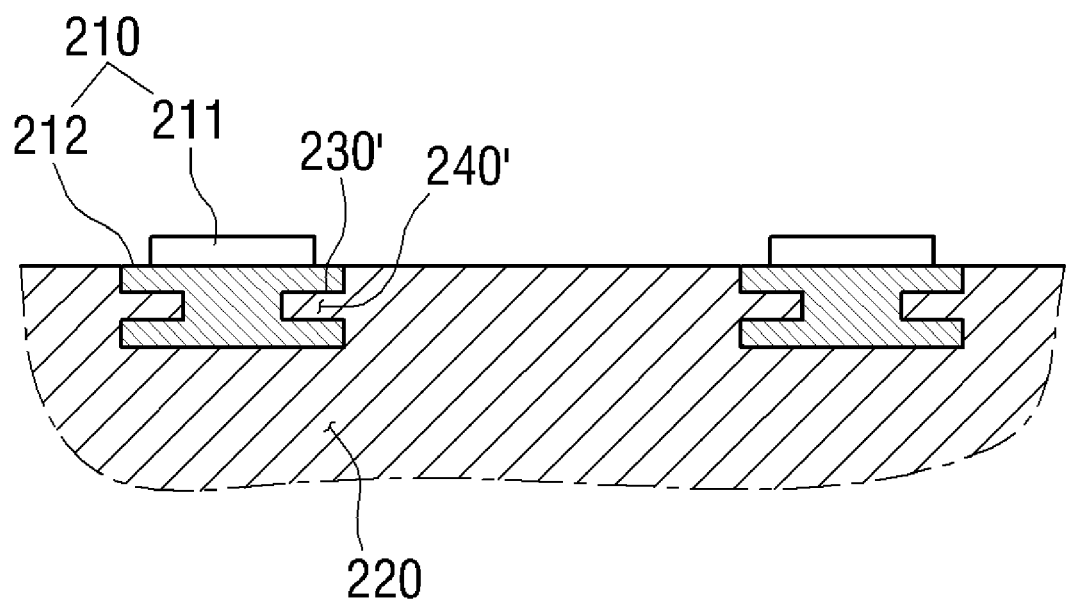
FIG. 6 is a sectional view of the LCD of FIG. 5 when an LED module is attached to a frame.

FIG. 5 is an exploded perspective view of an LCD 100' according to an exemplary embodiment of the present invention, and FIG. 6 is a sectional view of the LCD 100' of FIG. 5 when an LED module 210 is attached to a frame 220.

Components capable of performing the same functions and operations as those of the components described above with reference to FIGS. 1, 2, 3, and 4 are designated by the same reference numbers, so no further description thereof is required.

The LCD 100' of FIG. 5 includes an upper case 110, a lower case 120, a liquid crystal panel 130, and a backlight unit 200'.

As shown in FIGS. 5 and 6, the backlight unit 200' includes an LED module 210, a frame 220, a first mounting portion 230', a second mounting portion 240', a fixing unit 250' and an optical sheet 270. The LED module 210 is disposed below the liquid crystal panel 130 to provide light directly to the entire surface of the liquid crystal panel 130, which differs from the backlight unit 200 shown in FIG. 1. The backlight unit 200' is referred to as a direct-type backlight unit. Since the LED module 210 described above with reference to FIG. 1 is disposed on the edge of the liquid crystal panel 130, light is supplied towards a side surface of the liquid crystal panel 130, so the LGP 260 is required. However, in this exemplary embodiment of the present invention with reference to FIGS. 5 and 6, the LGP 260 is not required because the LED module 210 shown in FIG. 5 supplies light directly to the entire surface of the liquid crystal panel 130.

The first mounting portion 230' is engaged with the second mounting portion 240' so that the LED module 210 is inserted into the frame 220 in the same manner as described above with reference to FIG. 1. Referring to FIG. 6, only the LEDs 211 are disposed above the frame 220, and the metal substrate 212 is disposed inside the frame 220. Accordingly, the thickness of the backlight unit 200' may be reduced. Additionally, as the first mounting portion 230' and the second mounting portion 240' are configured in the form of a slit or rib, the contact area between the metal substrate 212 and the frame 220 increases, improving the cooling performance of the LEDs 211. Furthermore, there is no need to use screws to engage the LED module 210 with the frame 220, to increase productivity.

In the same manner as described above with reference to FIG. 1, the first mounting portion 230' and the second mounting portion 240' may vary in shape and position. Additionally, the first mounting portion 230' and the second mounting portion 240' may have grooved surfaces to improve the cooling performance of the LEDs 211, caused by an increase in the contact area between the metal substrate 212 and the frame 220.

After the LED module 210 is completely inserted into the frame 220, the fixing unit 250' is fitted into the second mounting portion 240' formed in the frame 220, to prevent the LED module 210 from being separated from the frame 220.

The fixing unit 250' may be made of elastic material which has a thickness slightly greater than that of the second mounting portion 240'. Accordingly, if the fixing unit 250' is fitted into the second mounting portion 240', the LED module 210 may be fastened to the frame 220.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A liquid crystal display (LCD) comprising:
a liquid crystal panel which displays an image;
a backlight unit which supplies light to the liquid crystal panel; and
upper and lower cases which house and fix the liquid crystal panel and the backlight unit, the backlight unit comprising:
a light emitting diode (LED) module comprising a metal substrate and an LED which is disposed on a first side of the metal substrate;
a frame on which the LED module is mounted;
a first mounting portion formed lengthwise on a second side of the metal substrate which is opposite to the first side; and
a second mounting portion formed on the frame opposing the second side,
the second mounting portion remaining within a width of the LED module,
wherein the LED module is coupled to the frame by matchingly engaging a geometric shape of the first mounting portion with a geometric shape of the second mounting portion.

2. The LCD as claimed in claim 1, further comprising:
a fixing unit which fastens the LED module mounted on the frame.

3. The LCD as claimed in claim 2, wherein the fixing unit comprises:
a fixing groove which is formed in one of the metal substrate and the frame; and
a fixing projection which is fitted into the fixing groove.

4. The LCD as claimed in claim 3, wherein the fixing unit further comprises:
an elastic member which pushes the fixing projection towards the fixing groove.

5. The LCD as claimed in claim 2, wherein the fixing unit is fitted into the second mounting portion after the LED module is completely inserted into the frame.

6. The LCD as claimed in claim 1, wherein the first mounting portion is formed on a third side of the metal substrate which neighbors the first side.

7. The LCD as claimed in claim 1, wherein the first mounting portion is formed on third and fourth sides of the metal substrate which neighbor the first side.

8. The LCD as claimed in claim 1, wherein the first mounting portion includes a slit, and the second mounting portion includes a rib which is matchingly engageable with the slit.

9. The LCD as claimed in claim 1, wherein the first mounting portion includes a rib, and the second mounting portion includes a slit which is matchingly engageable with the rib.

10. The LCD as claimed in claim 1, wherein the first mounting portion includes a T-shaped slit.

11. The LCD as claimed in claim 1, wherein the first mounting portion includes an L-shaped slit.

12. The LCD as claimed in claim 1, wherein the first mounting portion includes a straight slit.

13. The LCD as claimed in claim 1, wherein the first mounting portion has a plurality of slits.

14. The LCD as claimed in claim 1, wherein the first mounting portion and the second mounting portion include grooved surfaces formed thereon.

15. The LCD as claimed in claim 1, wherein the LED module is disposed proximate an edge boundary of a liquid crystal panel.

16. The LCD as claimed in claim 1, wherein the LED module is disposed below a liquid crystal panel.

17. A liquid crystal display (LCD) comprising:
a liquid crystal panel which displays an image;
a backlight unit which supplies light to the liquid crystal panel; and
upper and lower cases which house and fix the liquid crystal panel and the backlight unit,
wherein the backlight unit comprises:
a light emitting diode (LED) module comprising a plurality of LEDs and a metal substrate on which the plurality of LEDs is mounted;
a frame on which the LED module is mounted;
a first mounting portion which is formed on a first side of the metal substrate which is opposite to a second side on which the plurality of LEDs is mounted; and
a second mounting portion which is disposed on the frame opposing the first side,
wherein the LED module is coupled to the frame by matchingly engaging a geometric shape of the first mounting portion with a geometric shape of the second mounting portion.

18. The LCD as claimed in claim 17, wherein the frame comprises:
a support which supports the LED module; and
a base which is disposed on a lower boundary of the case,
wherein the support and the base are perpendicular to each other.

19. The LCD as claimed in claim 18, wherein the frame is formed on at least two edges of the case.

20. The LCD as claimed in claim 18, wherein the frame is formed on four edges of the case.

21. The LCD as claimed in claim 18, wherein a height of the support is less than or equal to a width of the metal substrate.

22. The LCD as claimed in claim 18, wherein the backlight unit further comprises:
a reflective sheet which reflects a light emitted from the LED module; and
a light guide plate (LGP) which is disposed on the reflective sheet and supplies the light reflected by the reflective sheet and the light emitted from the LED module to the liquid crystal panel,
wherein the base comprises a second base facing a central part of the case, and
the second base supports boundaries of the reflective sheet and the LGP.

23. The LCD as claimed in claim 22, wherein the base further comprises a first base facing a sidewall of the case,
the frame is spaced apart from the sidewall of the case by the first base, and
a thickness of the first base is greater than that of the second base.

24. The LCD as claimed in claim 17, wherein the LED module is fixed to the support using a screw.

25. The LCD as claimed in claim 17, wherein the second mounting portion is formed on the support of the frame to correspond to the first mounting portion, the second mounting portion remaining within a width of the LED module.

26. The LCD as claimed in claim 25, wherein the backlight unit further comprises:
a fixing unit which fastens the LED module mounted on the frame.

27. The LCD as claimed in claim 26, wherein the fixing unit comprises:
a fixing groove which is formed in one of the metal substrate and the frame; and
a fixing projection which is fitted into the fixing groove.

28. The LCD as claimed in claim 27, wherein the fixing unit further comprises:
an elastic member which pushes the fixing projection towards the fixing groove.

29. A television (TV) device comprising:
a signal receiver which receives an external signal;
a signal processor which processes the external signal received by the signal receiver and generates an image signal; and
a liquid crystal display (LCD) which receives the image signal generated by the signal processor and displays an image,
wherein the LCD comprises:
a liquid crystal panel which displays an image;
a backlight unit which supplies light to the liquid crystal panel; and
upper and lower cases which house and fix the liquid crystal panel and the backlight unit,
wherein the backlight unit comprises:
a light emitting diode (LED) module comprising a plurality of LEDs and a metal substrate on which the plurality of LEDs is mounted;
a frame on which the LED module is mounted;
a first mounting portion which is formed on a first side of the metal substrate which is opposite to a second side on which the plurality of LEDs is mounted; and
a second mounting portion which is disposed on the frame opposing the first side,
wherein the LED module is coupled to the frame by matchingly engaging a geometric shape of the first mounting portion with a geometric shape of the second mounting portion.

* * * * *